United States Patent
Chan et al.

(10) Patent No.: US 7,086,155 B2
(45) Date of Patent: Aug. 8, 2006

(54) APPARATUS FOR CORING INTO AND CUTTING FOOD ITEMS

(75) Inventors: David Chan, Scarborough (CA); David Green, Toronto (CA); Neal Ho, San Francisco, CA (US)

(73) Assignee: Browne & Co., Ontario (CA)

( * ) Notice: Subject to any disclaimer, the term of this patent is extended or adjusted under 35 U.S.C. 154(b) by 6 days.

(21) Appl. No.: 10/893,556

(22) Filed: Jul. 16, 2004

(65) Prior Publication Data

US 2006/0011027 A1    Jan. 19, 2006

(51) Int. Cl.
*A47J 17/00* (2006.01)

(52) U.S. Cl. ............................... 30/114; 30/302; 30/316
(58) Field of Classification Search ................. 30/114, 30/301, 302, 303, 315, 316; 83/13
See application file for complete search history.

(56) References Cited

U.S. PATENT DOCUMENTS

| | | | |
|---|---|---|---|
| 703,331 A | 6/1902 | Acree | |
| 951,241 A | 3/1910 | Hampel | |
| 2,560,229 A | 7/1951 | Leavens | |
| 2,625,972 A | 1/1953 | Torres | |
| 2,836,212 A | 5/1958 | Shaw | |
| 3,128,810 A | 4/1964 | Whipp | |
| 3,468,355 A | 9/1969 | Hall | |
| 3,830,151 A | 8/1974 | Gerson | |
| 4,062,260 A | 12/1977 | Steinhogl | |
| 4,095,518 A | 6/1978 | Jones | |
| 4,436,025 A | 3/1984 | Jones | |
| 4,545,297 A | 10/1985 | Ihlow | |
| 4,569,280 A | 2/1986 | D'Ambro et al. | |
| 4,690,047 A | 9/1987 | Balzano | |
| 5,142,973 A | 9/1992 | Tur et al. | |
| 5,373,781 A | 12/1994 | Knasel | |
| 5,375,512 A | 12/1994 | Ertmer | |
| 5,421,249 A | 6/1995 | Repisky et al. | |
| 5,463,943 A | 11/1995 | Knasel | |
| 5,947,016 A | 9/1999 | Repac et al. | |
| D415,937 S | 11/1999 | Robinson | |
| 6,371,014 B1 | 4/2002 | Ismail et al. | |

*Primary Examiner*—Charles Goodman
(74) *Attorney, Agent, or Firm*—Robert W Strozier

(57) ABSTRACT

The present invention provides for an apparatus for coring and slicing a food item comprising: a) a peripheral member; b) a coring element; and c) a plurality of blades extending radially of the coring element to the peripheral member, in spaced relation about the coring element. The apparatus may be combined with a base for securing the food item. Methods of constructing the apparatus are also encompassed by the present invention.

23 Claims, 4 Drawing Sheets

US 7,086,155 B2

APPARATUS FOR CORING INTO AND CUTTING FOOD ITEMS

FIELD OF THE INVENTION

The present invention relates to an apparatus for coring into and cutting food items, in particular an apparatus for coring into and cutting fruits and vegetables, and more particularly, to an apparatus for coring into and cutting an onion.

BACKGROUND OF THE INVENTION

There are a number of different utensils available that allow a user to cut into a food item so as to divide the food item into smaller-sized portions, and wherein each portion has a similar or nearly-identical size and shape. Most commonly, a paring or a highly-sharpened, general purpose kitchen knife is used to core into and cut food items, for example various fruits and vegetables such as an apple or an onion. Inherent with the use of such a utensil is that the user can be severely injured if the knife and/or the food item were to slip. As well, there is the inconvenience that the user must manipulate the knife and/or food item through several steps while coring into and cutting the food item in order to complete the division of the food item into the smaller portions. As well, if the food item is cored throughout, and it is desired that the portions be arranged in a configuration representative of the food item in a pre-cut state, it is typically necessary to re-handle the cut portions. Furthermore, if a user employs a knife as the coring and cutting utensil, it is difficult to assure that all of the cut portions of the food item are of nearly equal size and shape. Lastly, often the food item itself may be damaged during the coring and/or slicing steps, for example due to excess pressure being applied by the user when trying to firmly grasp the food item.

As an alternative to the use of a hand held knife, it may be advantageous to provide an apparatus for coring into and cutting a food item whereby a desired food item could be cored into and cut into a plurality of sections of nearly-equal size and shape, and wherein the apparatus requires a user to perform few procedural steps. As well, it would be desirable to provide for an apparatus for coring into and cutting a food item that could accomplish both operational tasks as part of single overall, procedural step. Such an apparatus would offer a considerable time and safety advantage to a user thereof, as the food item would be subjected to lesser handling.

It would be further advantageous to provide, in conjunction with an apparatus for coring into and cutting a food item, a means for securing the food item while the user cores into and cuts the food item. Provision of such means would assist in preventing the food item from becoming damaged, for example by being squashed, due to the exertion of excessive and/or uneven pressure upon the food item during the cutting process. Such means would also function as a convenient platform the subsequent serving to a consumer or consumers thereof of the food item that has been so cored into and cut by the user.

Thus, there is a need to provide for an apparatus for coring into and cutting food items that addresses at least some these shortcomings.

SUMMARY OF THE INVENTION

The present invention provides for an apparatus for coring into and cutting a food item. In one embodiment, there is provided an apparatus for coring into and cutting a food item comprising:
 a) a peripheral member;
 b) a coring element; and
 c) a plurality of blades extending radially of the coring element to the peripheral member, in spaced relation about the coring element.

BRIEF DESCRIPTION OF THE DRAWINGS

The present invention will now be described in greater in reference to the figures referred to below wherein.

DETAILED DESCRIPTION OF THE INVENTION

Figure 1:
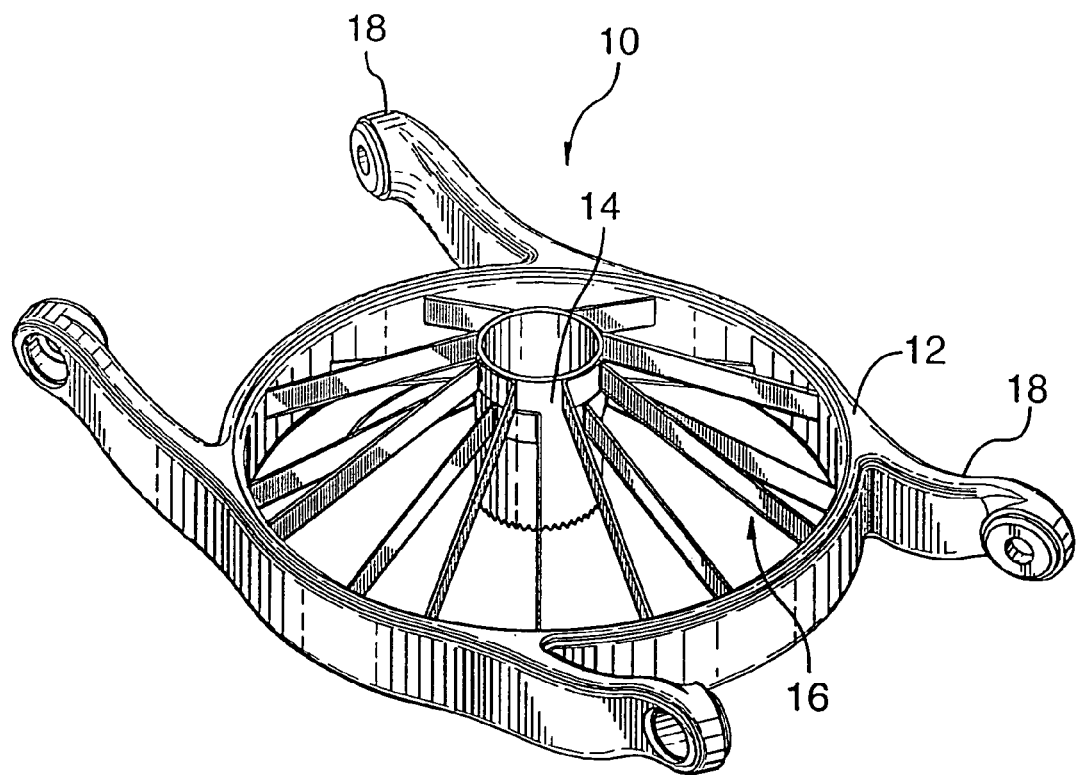
FIG. 1 is an isometric view of an apparatus for coring into and cutting food items according to one embodiment of the present invention.
Figure 2:
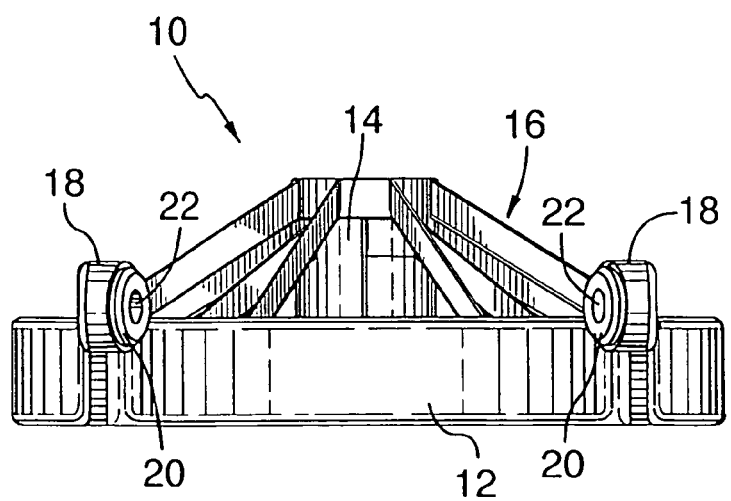
FIG. 2 is a front view of the apparatus as shown in FIG. 1.
Figure 3:
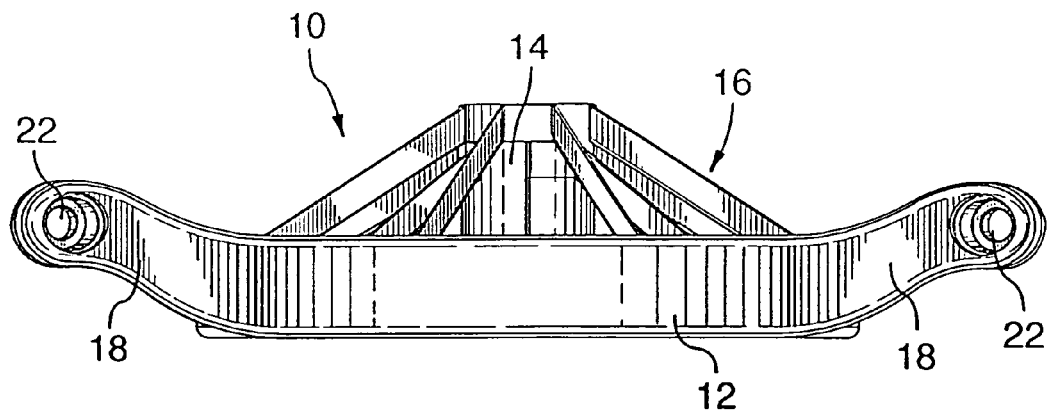
FIG. 3 is a side view of the apparatus as shown in FIG. 1.

The present invention will now be described with reference to an embodiment provided in FIG. 1. As shown in FIG. 1, there is an apparatus 10 for coring into and cutting a food item comprising a peripheral member 12, a coring element 14, and a plurality of blades 16 that extend radially of coring element 14 to peripheral member 12, in spaced relation about the coring element 14. As shown in FIGS. 2 and 3, in the present example of the invention the plurality of blades 16 are arranged in an inclined manner between the peripheral member 12 and the coring element 14. Peripheral member 12 is provided with extensions 18 each of which has an flange 20 and an aperture 22 for fitting and fastening a handle 24 (see FIGS. 7 and 8). Fastening of the handle 24 to the extension 18 can be accomplished by any number of ways that would be familiar to a person of skill in the art, for example, by screwing the handle 24 to the extension 18.

Figure 4:
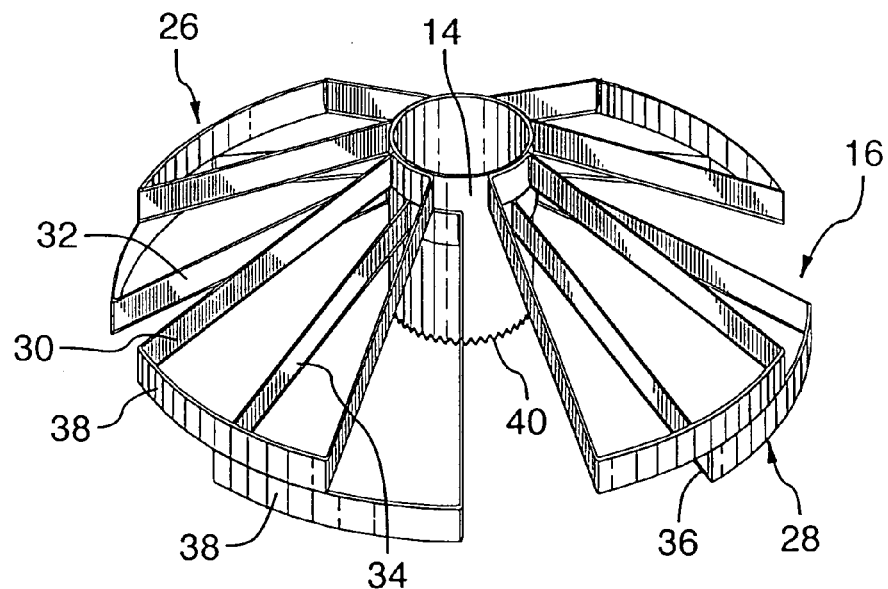
FIG. 4 is an isometric view of a coring element together with a plurality of blades extending radially from and spaced about the coring element.

As shown in greater detail in FIG. 4, the plurality of blades 16 are arranged as an upper tier 26 and a lower tier 28, wherein the upper tier 26 comprises a series of separate blades 30 and the lower tier comprises a series of adjacent, separate blades 32 and 34. The plurality of blades 16 and the coring element 14 can be manufactured from a number of different materials, for example a metal such as stainless steel or aluminium, or even a plastic or a ceramic material. For ease of manufacture, it is advantageous that the plurality of blades 16 and the coring element 14 be manufactured from the same material, which in the present example of the invention is stainless steel. As well, to enhance the slicing efficiency of the apparatus, each blade is provided with a cutting edge 36 that is serrated, and that is also chamfered from both sides to thereby provide a central point along the edge of the blade. Furthermore, while the plurality of blades 16 can be provided in a number of configurations, in the present example of the invention each blade 30, 32 and 34 is configured as a double-blade having a radially-terminus portion 38 shaped in conformity to the peripheral member 12, and wherein each blade 30 of the upper tier 26 overlaps each adjacent blade 32 and 34 of the lower tier 28.

Figure 5:
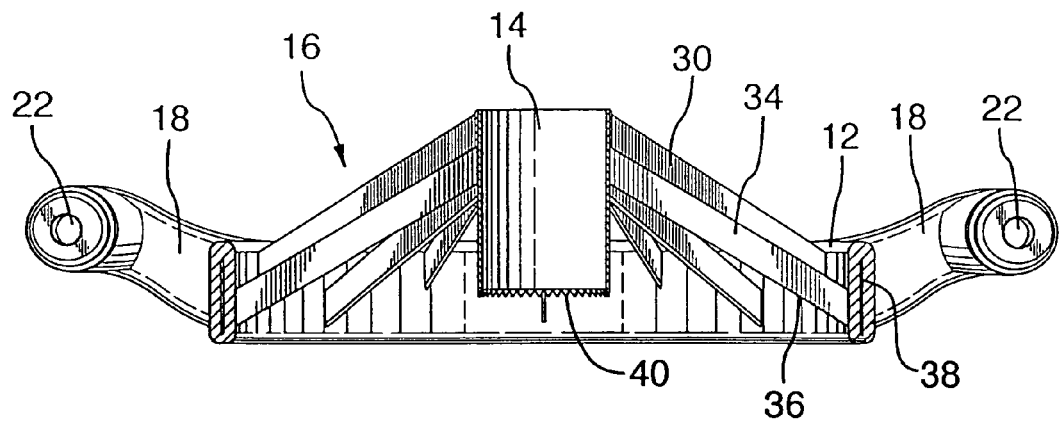
FIG. 5 is a sectional view of the apparatus as shown in FIG. 3, taken along the section line B—B.

In the present example of the invention, the plurality of blades 16 are welded to the coring element 14, although other means such as screws, rivets or adhesive could be used to secure the blades to the coring element 14. Fastening of the plurality of blades 16 to the peripheral member 12 can also be accomplished in a similar fashion. In the present example of the invention, the peripheral member 12 is manufactured from a plastic material and is circular. As shown in FIG. 5, the plurality of blades 16 co-operate with the peripheral member 12 by having at least the radially-terminus portion 38 integrated therein.

The coring element 14 can be configured in any number of sizes and shapes. For example, as shown in FIGS. 4 and 5, the coring element 14 is a tube that is centrally-located within the apparatus. Cutting teeth 40 are provided at the end of the tube to aid in the coring of the food item.

Figure 6:
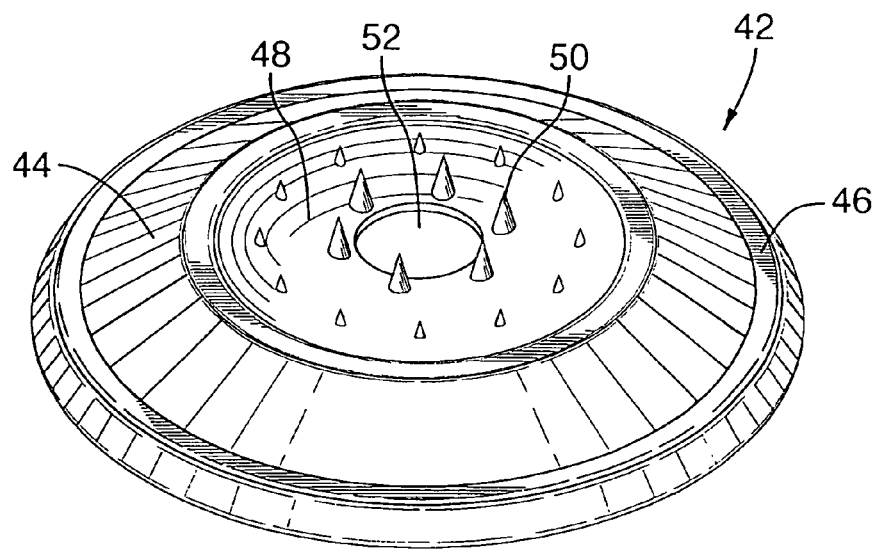
FIG. 6 is an isometric view of a base for securing a food item.
Figure 7:
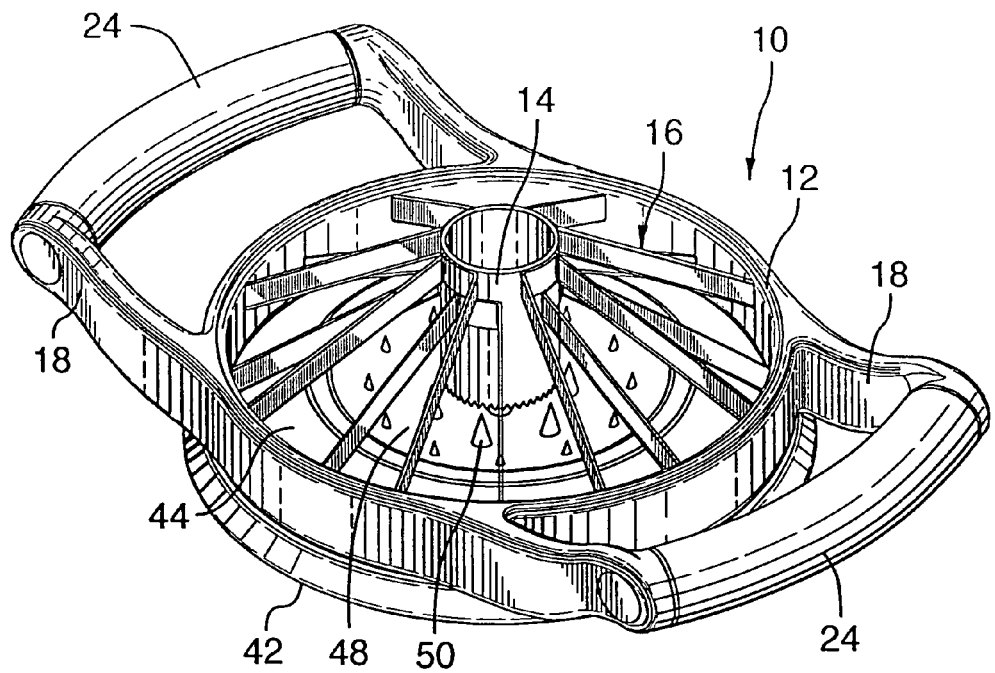
FIG. 7 is an isometric view of a combination of an apparatus for coring into and cutting a food item, wherein the apparatus has been equipped with handles, and a base for securing a food item.

Referring to FIG. 6, a base 42 can be provided in combination with the apparatus, whereby the food item is secured to the base 42 while the user cores into and cuts the food item. As shown in FIGS. 6 and 7, the base 42 can be provided as a disc having a cambered portion 44 that begins at a lip 46 and a central depression 48 for accommodating the food item and for retaining any fluid that may be released from the food item during the coring and slicing procedure. As shown in greater detail in FIG. 6, the base can be provided with a number of protruding elements 50 upon which the food item is impaled and therefore secured. While a person of skill in the art would recognize that protruding elements 50 could be provided in any number and combination of configurations, in the present example of the invention, the protruding elements 48 are configured as cone-shaped spikes. Advantageously, the central depression 48 of the base 42 may be provided with means to allow for a root or roots of the food item to be positioned in a manner so as to not interfere with the securing of the food item to the base 42. In the present example of the invention, the means comprise an aperture 52 at or near the center of the central depression 48.

Figure 8:
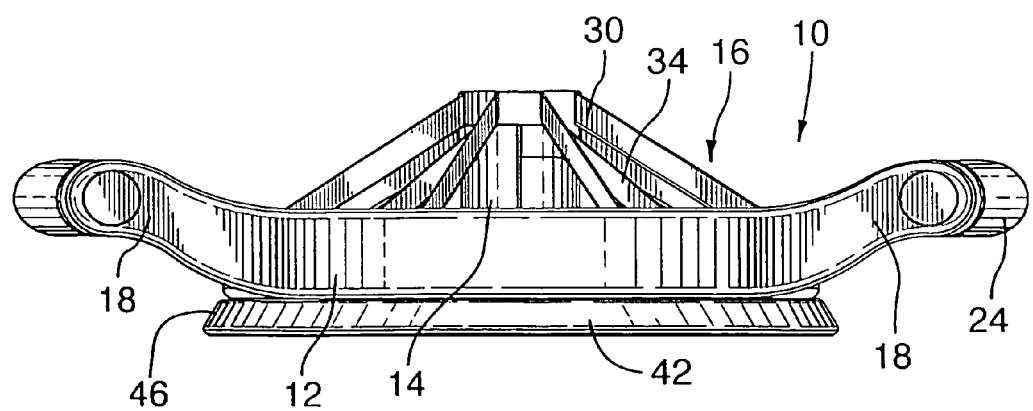
FIG. 8 is a side view of the combination shown in FIG. 7.

Referring to FIGS. 7 and 8, the peripheral member 12 of the apparatus rests on the lip 46 of the base 42, while the extensions 18 having an attached handle 24 extend the base 42 so as to be easily accessible to a user. The central depression 48 has a depth sufficient to accommodate the coring element without having the coring element 14 coming into contact the base 42. Thus, even when the peripheral member 12 rests upon the lip 46 of the base 42, the cutting teeth 40 of the coring element 14 are free of contacting the central depression 48 of the base 42. In operation, the user first removes an end of the food item, such as a top of an onion, and leaves the opposite end of the food item intact. Where necessary, the user also peels off the outer skin of the food item. The food item is then placed on the base 42 and secured thereupon by firmly pushing the food item onto the protruding elements 50. Grasping the apparatus by the handles 24, the food item is contacted at its center by the coring element 14, wherein the cutting teeth 40 provided on the coring element 14 begin to dig into the food item. At this stage, to aid in initiating the coring process, the user can also begin to rotate the apparatus without causing the food item to detach from the base 42 due to the food element being held in position by the protruding elements 50. After the coring element 14 partially enters the food item, downward pressure is continued to be applied by the user and the plurality of blades 16 on the lower tier 28 contact and begin to cut into the food item. Entry of the blades on the lower tier 28 is followed by entry of the blades of the upper tier 26. Movement of the blades through the food item is facilitated by providing blades having a minimal thickness. As well, movement of the blades 16 through the food item can be assisted by the user firmly holding each handle 24 and engaging in a slight rocking motion. Given that the plurality of blades 16 are, in the present example of the invention, welded to the coring element 14 and integrated into the peripheral member 12, little upward bowing of the blades occurs during the coring and slicing procedure.

On contact of the peripheral member 12 with the lip 46 of the base 42, the user continues to grasp each handle 24 and at the same time places one or both thumbs on the center portion of the food item. The apparatus 10 is then withdrawn from the food item that has been cored into and cut by the user. As the cutting teeth 40 do not contact the central depression 48, the food item is left intact as the center portion that has been cored into remains connected to the cut portions of the food item. Thus, after the user withdraws the apparatus, and optionally removes the center portion, the food item is free to form a shape similar to that of a flower blossom. Advantageously, the user can thereafter subject the food item to further preparative steps, such as battering and deep-frying, while the food item remains intact. The food item so prepared could then be served while maintaining its flower blossom shape. As well, on withdrawing the apparatus from the food item, the user has an option of completely separating one or more of the cut portions of the food item prior to any further processing or the serving of the food item. Conveniently, the base 40 may be thereafter used to present or serve the prepared food item.

Advantageously, the apparatus of the present invention has no moving internal parts, for example, a spring-biased cutting mechanism. As such, the apparatus may have a greater functional life-span as compared to one having moving parts, given that moving parts would be subjected to greater where-and-tear over time with repeated use of the apparatus. As well, an apparatus of the present invention may offer a more sanitary environment for food preparation as there would be lesser opportunity for the entrapment food particles within the apparatus.

The above-described embodiments of the invention are intended to be examples of the present invention, and alterations and modifications may be affected thereto, by a person of skill in the art, without departing from the scope of the invention which is defined by the claims appended hereto.

The invention claimed is:

1. An apparatus for coring into and cutting a food item comprising:
   a) a peripheral member defining a periphery;
   b) a coring element disposed within the periphery; and
   c) a plurality of blades extending between and interconnecting the coring element and the peripheral member, and being arranged to produce segments of the cut food item, the plurality comprising an upper blade tier and a lower blade tier, the lower blade tier cutting the food item before the upper blade tier when the apparatus is in use.

2. The apparatus of claim 1, wherein each blade of the plurality of blades is oriented to produce an inclined cutting edge.

3. The apparatus of claim 2, wherein the plurality of blades are arranged as an upper tier and a lower tier.

4. The apparatus of claim 2, wherein each blade of the plurality of blades comprises a cutting edge a chamfered alone the length of the cutting edge.

5. The apparatus of claim 4, wherein the plurality of blades are arranged as blade pairs.

6. The apparatus of claim 5, wherein the plurality of blades are welded to the coring element.

7. The apparatus of claim 6, wherein the coring element comprises a tube comprising a cutting end having a plurality of cutting teeth.

8. The apparatus of claim 7, wherein the cutting edge is a serrated cutting edge.

9. The apparatus of claim 1 further comprising at least one handle connected to the peripheral member.

10. The apparatus of claim 9, wherein the at least one handle is connected to the peripheral member.

11. The apparatus of claim 1, wherein the peripheral member is manufactured from a plastic material.

12. The apparatus of claim 11, wherein the plurality of blades are shaped to integrally co-operate with the peripheral member.

13. The apparatus of claim 1, wherein the peripheral member is circular.

14. The apparatus of claim 4, wherein the cutting edge further comprises a second chamfer, opposite the first chamfer, along the length of the cutting edge.

15. The apparatus of claim 5, wherein a blade pair selected from the upper blade tier is positioned in an overlapped and staggered relationship with a blade pair selected from the lower blade tier.

16. The apparatus of claim 7, wherein the cutting end is positioned relative to the peripheral member to core at most a portion of the food item.

17. The apparatus of claim 9, further comprising a pair of opposed handles extending radially from the peripheral member, the handles being offset with respect to the peripheral member by a degree sufficient to accommodate a user's hands when the apparatus is in use.

18. The apparatus of claim 1, further comprising a base for securing the food item, the base being positionable in relation to the coring element and the plurality of blades.

19. The apparatus of claim 18, wherein the base comprises a cambered disc with a central depression having a depth to accommodate and avoid contact with the coring element.

20. The apparatus of claim 19, wherein the central depression is provided with a plurality of protruding elements for securing the food item to the base.

21. In combination:
a) an apparatus for coring into and cutting a food item comprising:
  i) a peripheral member defining a periphery;
  ii) a coring element disposed within the periphery; and
  iii) a plurality of blades extending between and interconnecting the coring element and the peripheral member, and being arranged to produce segments of the cut food item, the plurality comprising an upper blade tier and a lower blade tier; the lower blade tier cutting the food item before the upper blade tier when the apparatus is in use;
b) a base for securing the food item.

22. The combination of claim 21, wherein the base is a cambered disc with a central depression of a depth to accommodate and avoid contact with the coring element.

23. The combination of claim 22, wherein the central depression is provided with a plurality of protruding elements for securing the food item to the base.

* * * * *